Oct. 28, 1958 E. C. RANEY 2,858,076
CONTROL MECHANISM

Filed Feb. 23, 1952 2 Sheets-Sheet 1

INVENTOR.
ESTEL C. RANEY
BY Hudson, Boughton,
Williams, David & Hoffmann
ATTORNEYS Oct. 28, 1958     E. C. RANEY     2,858,076
CONTROL MECHANISM
Filed Feb. 23, 1952     2 Sheets—Sheet 2
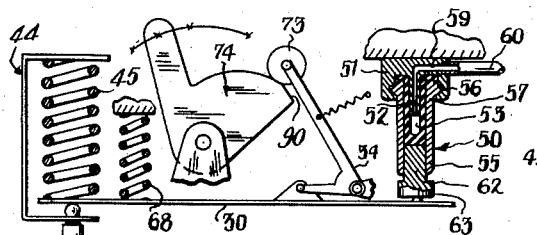
Fig. 5
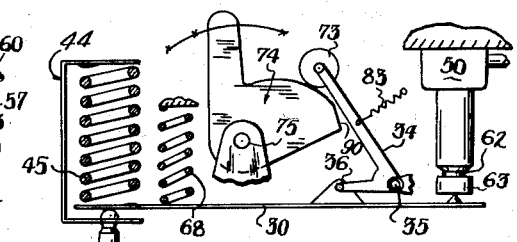
Fig. 6
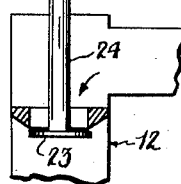
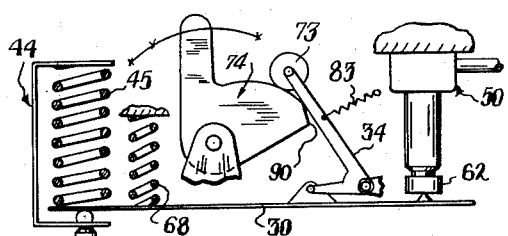
Fig. 7
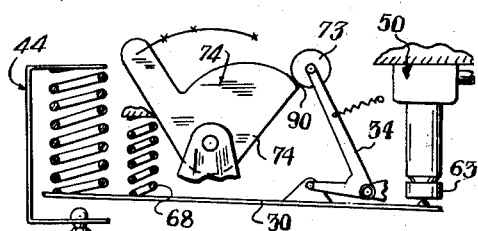
Fig. 8
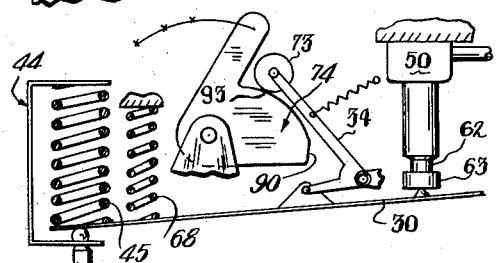
Fig. 9
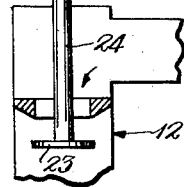
INVENTOR.
ESTEL C. RANEY
BY Hudson Boughton,
Williams, David & Hoffmann
ATTORNEYS

United States Patent Office 2,858,076
Patented Oct. 28, 1958

2,858,076

CONTROL MECHANISM

Estel C. Raney, Delaware, Ohio, assignor to Ranco Incorporated, Columbus, Ohio, a corporation of Ohio Application February 23, 1952, Serial No. 273,082

1 Claim. (Cl. 236—99)

The present invention relates to a control mechanism, and more particularly to a control mechanism having a pressure responsive power element and having means to selectively adjust the pressures in the power element at which the mechanism is operative.

A primary object of the present invention is the provision of a control device, such as a valve, actuated by a pressure responsive power element to provide a range of control according to pressure conditions in the element, and having manual means to selectively adjust the pressures at which the device is actuated and to manually actuate the device throughout its range of control in the event of failure of the power element.

Another object of the present invention is the provision of a control mechanism of the character referred to which is actuated by an expansible power element through a lever interconnecting the control device and a movable part of the element, and which lever is carried by a pivot, the relative position of which pivot and element can be selectively shifted whereby the amount of movement of the element required to actuate the control device may be altered, as desired.

Another object of the invention is the provision of a control mechanism of the character referred to which has means to limit the movement of the expansible element in at least one direction, and means for selectively shifting the relative position of the pivot of the lever and expansible element throughout a range to cause the lever to be fulcrumed about the element whereby the control mechanism can be selectively operated manually.

Other objects and advantages of the invention will be apparent from the following description of a preferred form of the invention, reference being made to the accompanying drawings wherein.

Figure 1:
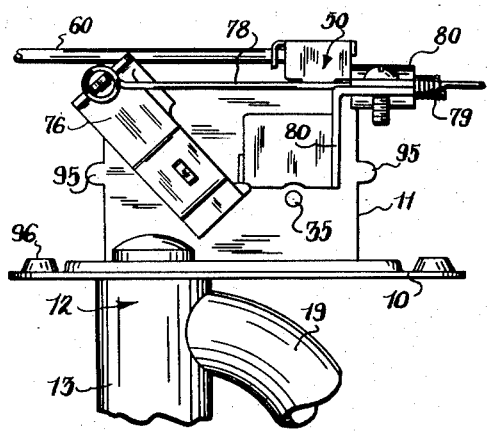
Fig. 1 is a side elevational view of a thermostatically controlled liquid valve embodying the invention.
Figure 2:
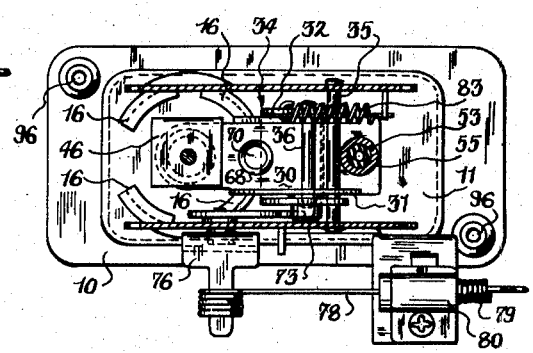
Fig. 2 is a sectional view of the valve shown in Fig. 1 taken on a line 2—2 of Fig. 3.
Figure 3:
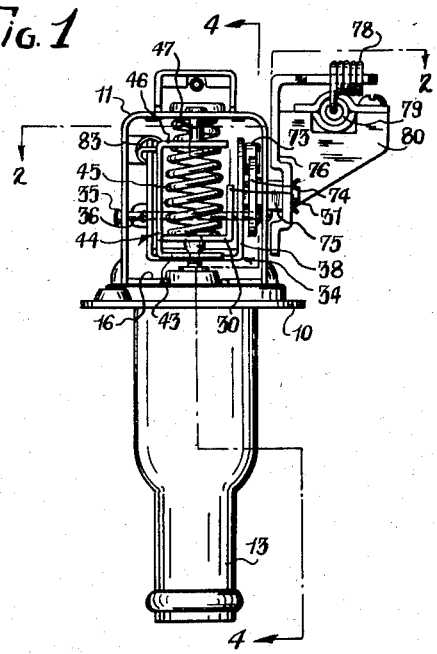
Fig. 3 is an end view of the valve.
Figure 4:
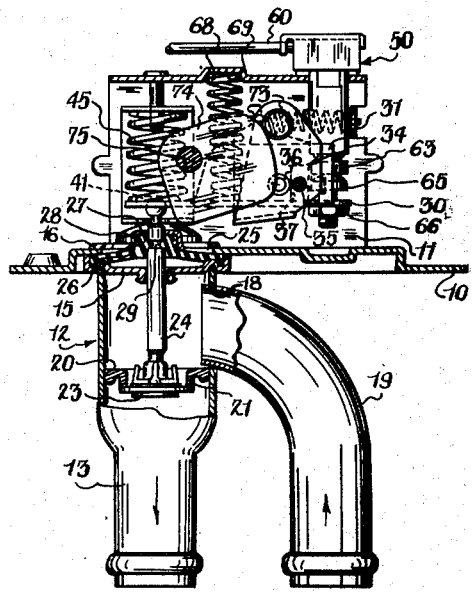
Fig. 4 is a sectional view taken substantially along line 4—4 of Fig. 3.

Figs. 5 to 9 diagrammatically illustrate the valve mechanism with certain parts thereof in different positions.

Although the invention may be embodied in different forms of control mechanisms, such as pressure or temperature responsive electrical switch or valve mechanisms, it is here shown embodied in a thermostatically operated valve for controlling the flow of a heating medium in response to temperature conditions influenced by the heating medium. For example, the valve may be utilized to control the flow of liquid through a heat exchanger for heating the air in the passenger compartment of an automobile in accordance with the temperature inside the compartment. The valve comprises a housing formed of a base 10 having the open end of an inverted U-shape sheet metal member 11 attached thereto. A valve chamber 12 is attached to the under side of the base 10 and it preferably comprises a main tube 13 having its upper end closed by a plate 15 which has an annular groove therein into which the end of the tube is brazed. The outer portion of the plate 15 is flanged and has four ears 16 which project through arcuate slots in the base 10 and which are turned over against the base to secure the plate and the tube attached thereto to the base. The side of the tube 13 has an opening 18 therethrough, and one end of a curved tube 19 is brazed in the opening. The tube 19 forms the inlet of the valve, and the lower end of tube 13 provides the outlet, although the direction of flow through the valve could be reversed, if desired. An annular valve seat 20 is brazed to the insides of the tube 13 immediately below the opening 18 and has a downwardly projecting rim 21 which forms a seat for a valve plate 23 carried on the lower end of a stem 24. The stem 24 projects through a central opening in the plate 15 and upwardly through an opening 25 in the base plate 10. A fluid tight flexible seal is provided between the valve stem 24 and the plate 15 by a rubber or rubber-like disk 26 which has a neck 27 through which the stem 24 projects. The peripheral portion of the disk 26 is pressed between the peripheral portions of the plate 15 and the underside of the base 10 to form a fluid-tight seal herewith, and a wire ring 28 compresses the neck 27 of the disk into a groove 29 formed about the stem 24 to form a seal.

The construction of the valve shown does not necessarily form a part of the invention, and it is to be understood that any other suitable form of valve or control device, such as an electrical switch, could be utilized.

The valve stem 24 is adapted to be moved longitudinally by a lever 30 to move the plate 23 to and from the seat 21. In the form shown, the lever 30 comprises a sheet metal stamping which has two upwardly extending side flanges 31, 32, and is pivotally carried on a U-shape adjusting member 34 which is pivoted on a pin 35 journaled in openings through opposite sides of the housing member 11. The lever 30 nests between the sides of the adjusting member 34 and is pivoted on a pin 36 which is journaled in the sides of the member 34. The flanges 31, 32 of the lever 30 are cut away as indicated at 37 to receive the pivot pin 35. It will be noted that the pins 35, 36 are situated so that the lever 30 is raised and lowered when the member 34 is swung in opposite directions about the pin 35.

One end of the lever 30 is offset to provide a circular boss 41 on one side of the lever and a corresponding depression in the other side into which the outer end of the valve stem 24 is received. The outer end of the valve stem preferably has a spherical or ball formation thereon so that it makes a point contact with the lever 30 and provides a neck portion immediately below the spherical formation which is received in a slot in one leg 43 of a C-shape bracket 44. The edge portions of the slot in the leg 43 engage opposite sides of the under part of the ball on the valve stem 24, and the bracket is normally urged upwardly by a compression spring 45 centered on the lever 30 by the boss 41 and having its upper end engaging the upper horizontal leg 46 of the bracket 44. Preferably, the leg 46 has an opening which receives a guide pin 47 attached to and depending from the upper wall of the housing member 11. The pin 47 guides the bracket 44 vertically so that the bracket is resiliently urged upwardly by the spring 45 to yieldingly maintain the stem 24 against the underside of the lever 30.

The lever 30 is adapted to be moved clockwise about its pivot pin 36 as viewed in the drawings, by an expansible power element 50 which is attached to the upper wall of the housing member 11 and which has a part which projects downwardly through an opening through the housing and into engagement with the lever.

The expansible element may be of any suitable construction, and in the present form which is best shown in Fig. 5, it comprises a cup shape base member 51 having a central neck portion 52 over which a cylindrical rubber member 53 is fitted. The end of the rubber member 53 fitted over the neck 52 has an annular flange thereon which abuts the inner wall of the member 51, and the outer end thereof is closed by a relatively thick wall. A rigid sleeve 55 surrounds the rubber member 53 and has a flange 56 at one end thereof which abuts the flange of the rubber member and is forced thereagainst by overturned portions 57 of the base member 51. The neck 53 is bored, which bore opens into a lateral bore 59 through the base member, and a capillary tube 60 is attached in the bore 59, as by brazing. The interior of the rubber member 53, by the bore 59 and the tube 60 are filled with a suitable liquid, which expands and contracts with changes in temperature, and the outer end of the tube 60 is sealed so that the expansion and contraction of the liquid causes corresponding outwardly and inwardly movements of the closed end of the rubber member in the sleeve 55. A plunger 62 is slidably positioned within the sleeve 55, and the inner end thereof abuts the end of the rubber member 53. The outer end of the plunger 62 has an enlargement or head 63 thereon and it will be seen that the head limits the inward movement of the plunger by striking the outer end of the sleeve.

Preferably, the major volume of the liquid in the power element 50 is in the tube 60 and may be concentrated in one area, for example, by coiling the tube or providing a bulb on the tube, so that the tube or bulb may be disposed in a particular location the temperature of which is to be controlled by the valve mechanism. The volume of the interior of the rubber member 53 will thus correspond substantially to the temperature of the tube 60 in which the major portion of the liquid therein is concentrated. Alternatively, the tube 60 could be extended so that the volume of liquid herein would correspond to the average temperature of the tube.

The plunger 62 is normally in engagement with the lever 30, and preferably, the lever has a bolt 65 threaded in an opening therethrough against which the head 63 of the plunger abuts. The bolts 65 may be positioned axially in the lever 30 by rotation thereof to provide initial adjustment of the lever relative to the plunger 62. That is to say, the lever 30 can be adjusted to position the valve plate 23 in any desired position relative to its seat 21 when the liquid in the tube 60 is at any given temperature. The bolt 65 can be locked in its adjusted position by a lock nut 66.

The lever 30 is normally urged counterclockwise about its pivot pin 36 by a coil spring 68 having one end resting in a depression 69 formed in the top wall of the housing member 11 and having its other end centered on a boss 70 formed in the lever 30.

It will be seen that when the plunger 62 of the expansible element 50 is moved downwardly, due to expansion of the liquid within the tube 60 of the element, the lever 30 is moved clockwise about its pivot and tends to close the valve plate 23 on its seat, and as the volume of the liquid in the expansible element decreases, the plunger 62 moves into the sleeve 55 and the spring 68 thereupon moves the lever counterclockwise, causing the valve plate to move from its seat. It will be seen that by shifting the pivot for the lever 30 in the direction of movement of the plunger 62, the amount of expansion of the rubber member 53 required to close the valve may be increased or decreased. In the form of the invention shown, the pivot for the lever 30 is supported in the adjusting member 34 and this member may be manually positioned about its pivot to raise and lower the pivot for the lever. For this purpose the member 34 has a roller 73 journaled on one of the sides thereof, and the roller rides on the periphery of a cam 74 which is attached to a shank 75 journaled in the side wall of the housing member 11. The outer end of the shank 75 has a crank arm 76 attached thereto which arm may be oscillated by a Bowden wire 78, one end of which is coiled about the crank arm and the opposite end of which extends to a point of control, not shown. One end of the sheathing 79 of the Bowden wire is supported by a clamp type bracket 80 attached to one end of the housing member 11 and the opposite end of the sheathing may be supported in a suitable clamp, not shown, and the wire projecting therefrom preferably has a knob attached thereto by which the operator of the control mechanism may move the wire longitudinally to swing the arm 76 and thereby position the cam 74 according to the adjustments of the control mechanism desired.

The tension of the spring 68 is such that the pivot for the lever 30 is continually urged downwardly which tends to rotate the adjusting member 34 counterclockwise about its pivot and maintain the roller 73 in engagement with the cam 74. Preferably, a part of the load of spring 68 acting through the roller 73 against the cam is counteracted so that the cam 74 may be easily rotated, and accordingly a counterbalancing tension spring 83 is arranged to urge the adjusting member 34 clockwise by attaching the ends thereof to the adjusting member and to a lug formed on the housing member 11.

The cam 74 is shaped so that as it is rotated counterclockwise, as seen in Figs. 5 to 9, the member 34 is moved clockwise, thereby raising the pivot for the lever 30 and tending to cause the valve to close. Since the pivot for the lever is moved in the direction of movement of the plunger 62 upon contraction of the rubber member 53, a lesser volume of liquid in the expansible element is required to actuate the valve to move to its open and closed positions. Accordingly, a lower temperature of the liquid in the tube 60 will operate the valve as the lever pivot is moved in the direction just described. The cam 74 is formed so that as it is rotated clockwise, the member 34 is moved counterclockwise, thereby lowering the pivot for lever 30 and causing the valve to tend to open, and accordingly a greater expansion of the rubber member 53 in the expansible element 50 is required to close the valve so that the operating temperature of the valve is thereby raised.

It is desirable to provide means to positively close the valve irrespective of the temperatures to which the tube 60 of the element 50 is subjected, and the cam 74 is therefore provided with a raised portion 90 at one end thereof which causes the member 34 to be moved to a position in which the lever 30 is moved clockwise about its pivot to hold the valve plate 23 closed on its seat, even though the head 63 of the plunger may be against the end of the sleeve 55. The resilient connection formed by the bracket 44 and spring 45 permits the lever 30 to move from the valve stem after the valve has been closed without injury or distortion of any of the parts of the mechanism so that the clockwise movement of the lever can be of such extent to assure closure of the valve in the event the rubber member 53 is exerting no pressure on the plunger 62.

The cam 74 has a low portion 93 at the opposite end which when engaged by the roller 73 causes the lever 30 to be moved downwardly or counterclockwise sufficiently to move the valve plate 23 from its seat to provide a wide open valve condition regardless of the expansion of the rubber member 53, which expansion is limited by the volume of liquid in the element 50.

By the construction shown, should the element 50 lose its liquid fill for any reason, the valve could be controlled by operating the cam 74 as described, in which event the lever 30 would pivot about the plunger 62, which would be held against the end of the sleeve 55 due to loss of pressure inside the rubber member 53, to position the valve as desired.

In the form of the invention shown, the ends of the housing for the control mechanism can be closed by suitable end plates, not shown, secured in place by crimp lugs 95 formed on the housing member 11. The base 10 has openings 96 by which the mechanism can be mounted on a suitable bracket or panel by bolts, not shown.

It will be seen that the improved control mechanism provides means by which an expansible element operated by a liquid fill can be utilized to actuate the control device and can be readily adjusted so that the temperatures or pressures at which the expansible element actuates the device can be selected. In addition, the control device can be selectively set in one or more control positions irrespective of the operative condition of the expansible element and can be manually controlled as desired in the event of failure of the power element.

Although only one form of the invention has been described, it will be apparent that other forms, adaptations and modifications could be employed all of which fall within the scope of the claim which follows.

I claim:

In a control mechanism having a control member movable between two control positions, an expansible element normally containing a thermally responsive fluid and having a part movable in response to changes in volume of the fluid therein, means forming a stop to limit movement of said part of said expansible element in one direction in response to decrease in volume of the fluid in said element, a lever operatively connecting said control member with said movable part of said element, a fulcrum for said lever spaced from the point of connection of said lever with said part and about which said lever is rocked by movement of said part of said element to move said control member from one control position to the other in accordance with volume changes of the fluid in said element, means urging said lever about its fulcrum and against said movable part of said element, and means to selectively and translatably shift said fulcrum for said lever in a direction parallel to the direction of movement of said movable part of said element and through a range of movement to pivot said lever about said movable part when said part is stopped at said limit and move said control member thereby from one control position to the other.

References Cited in the file of this patent

UNITED STATES PATENTS

| | | |
|---|---|---|
| 982,229 | Adair | Jan. 24, 1911 |
| 1,875,851 | Carson | Sept. 6, 1932 |
| 1,961,325 | Andersson | June 5, 1934 |
| 2,332,556 | Breese | Oct. 26, 1943 |
| 2,387,164 | McCarty | Oct. 16, 1945 |
| 2,239,525 | Johnson et al. | Apr. 22, 1951 |
| 2,664,246 | Ray | Dec. 29, 1953 |